United States Patent
Prosser et al.

(10) Patent No.: US 8,643,329 B2
(45) Date of Patent: Feb. 4, 2014

(54) OVERHEAD MOBILE CHARGER SYSTEM FOR REACHING AND CHARGING ELECTRIC VEHICLES PARKED IN A PAIR OF ADJACENT AND SPACED-PART ROWS OF SIDE-BY-SIDE PARKING SPACES

(75) Inventors: Ronald Prosser, Brooklyn, NY (US); Stephen M. Burchett, Brooklyn, NY (US)

(73) Assignee: Green Charge Networks, LLC, Mountain View, CA (US)

( * ) Notice: Subject to any disclaimer, the term of this patent is extended or adjusted under 35 U.S.C. 154(b) by 469 days.

(21) Appl. No.: 13/066,861

(22) Filed: Apr. 27, 2011

(65) Prior Publication Data
US 2012/0032635 A1 Feb. 9, 2012

Related U.S. Application Data

(60) Provisional application No. 61/400,842, filed on Aug. 3, 2010.

(51) Int. Cl.
*H02J 7/00* (2006.01)
(52) U.S. Cl.
USPC .......................................................... 320/109

(58) Field of Classification Search
USPC ............................. 320/109; 701/22; 180/65.1
See application file for complete search history.

(56) References Cited

U.S. PATENT DOCUMENTS

| | | |
|---|---|---|
| 4,158,802 A | 6/1979 | Rose |
| 4,846,320 A | 7/1989 | Clarke |
| 4,991,802 A | 2/1991 | Deacon |
| 5,323,099 A | 6/1994 | Bruni |
| 5,847,537 A | 12/1998 | Parmley |

*Primary Examiner* — Richard V Muralidar
(74) *Attorney, Agent, or Firm* — Holland & Hart

(57) ABSTRACT

An overhead mobile charger system for mounting between a pair of adjacent and spaced-apart rows of side-by-side parking spaces and exhibiting full circle traversing so as to reach and charge electric vehicles parked in the pair of adjacent and spaced-apart rows of side-by-side parking spaces. The system includes a single EV battery charger, a boom, and apparatus for rotatably mounting the boom over, and between, the pair of adjacent and spaced-apart rows of side-by-side parking spaces. The single EV battery charger has a power cable terminating in an EV connector. The power cable of the single EV battery charger runs along, and depends from, the boom, and together with the boom being rotatably mounted via the apparatus so as to allow the boom to exhibit full circle traversing, the electric vehicles parked in the pair of adjacent and spaced-apart rows of side-by-side parking spaces are reached and charged by the EV connector of the single EV battery charger.

9 Claims, 3 Drawing Sheets

OVERHEAD MOBILE CHARGER SYSTEM FOR REACHING AND CHARGING ELECTRIC VEHICLES PARKED IN A PAIR OF ADJACENT AND SPACED-PART ROWS OF SIDE-BY-SIDE PARKING SPACES

1. CROSS REFERENCE TO RELATED APPLICATIONS

The instant non-provisional patent application claims priority from provisional patent application No. 61/400,842, filed on Aug. 3, 2010, for COMPOUND CHARGING STATIONS, and incorporated herein by reference thereto.

2. BACKGROUND OF THE INVENTION

A. Field of the Invention

The embodiments of the present invention relate to an overhead charger system for electric vehicles, and more particularly, the embodiments of the present invention relate to an overhead mobile charger system for mounting between a pair of adjacent and spaced-apart rows of side-by-side parking spaces and exhibiting full circle traversing so as to reach and charge electric vehicles parked in the pair of adjacent and spaced-apart rows of side-by-side parking spaces.

B. Description of the Prior Art

The electric vehicle ("EV") charging industry is coming of age. Currently, EV chargers can only service one parking spot at a time.

Figure 1:
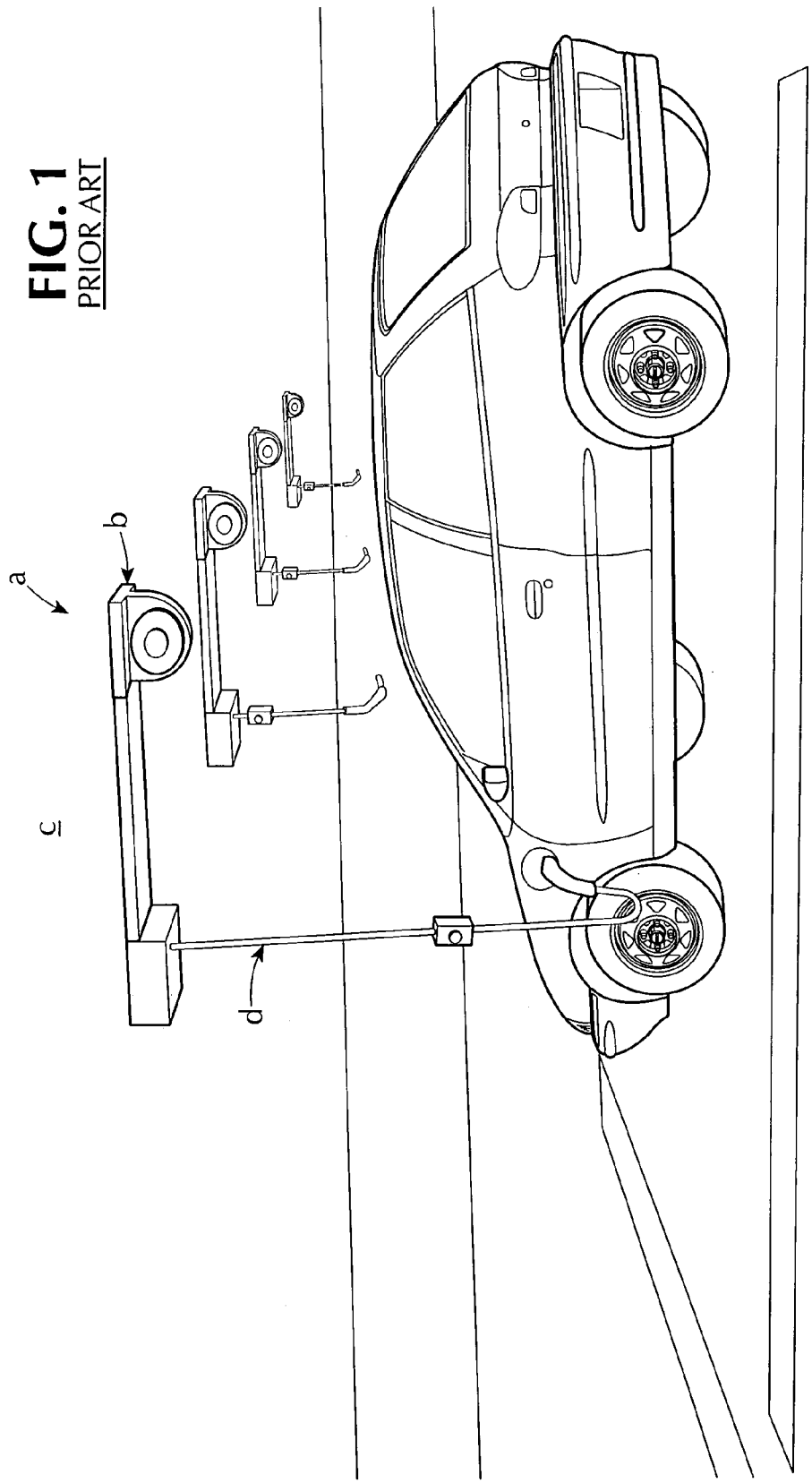

Referring now to FIG. 1, which is a diagrammatic perspective view of a typical prior art EV charging station design, the typical prior art EV charging station design a is for parking garage application, has an overhead charging unit b, and is produced by Control Module Industries.[1] The typical prior art EV charging station design a is typical of today's commercially available overhead systems, is mounted to a ceiling c, and has a retractable cable d.

[1] Control Module Industries, 89 Phonex Ave, Enfield, Connecticut 06082, (860) 745-2433, (800) 722-6654.

As EV market penetration increases so will the number of parking garage customers driving EVs. Garages having valet parking will have to be continuously moving EVs in order to service them from a single charger. In order to successfully charge multiple EVs with a single charger, a parking garage attendant will need to orchestrate the process. This person will be responsible for moving the first EV to be charged into the EVSE parking spot, connecting the EV charger to the EV, and activating the charger. Once charging is complete, the attendant will disconnect the EV charger from the EV, move the first EV to a different parking spot, move the second EV to be charged into the EVSE parking spot, and begin the process again.

There is only one alternative to this scenario currently available. Purchasing and installing additional EV chargers will allow the attendant to move an EV into one of several locations, thus minimizing operational complexity and time. Therefore, the bottleneck for an attendant to shuffle multiple EVs through a single charger could be significantly reduced and operational efficiencies gained. The cost of additional chargers and accompanying infrastructure costs, however, may not be economically feasible. Many of these chargers are likely to be level 3 chargers that are capable of charging an EV in a few minutes vs. an hour or more. Most level 3 chargers require a 60 amp 440 volt service or greater. Having multiple level 3 chargers will place significant stress on the facility electrical service. In addition to the cost of multiple chargers ($40-50 k each), the costs of running multiple conduits and wiring runs from the electrical panel box to chargers can add significant cost to installations. Furthermore, if the service to the panel and/or the panel box require(s) greater electrical capacity, the cost increases dramatically. Thus, there exists a need to have mobile charging stations that enable an operator to move efficiently from EV to EV so as to enable the charging infrastructure to be optimally used hence reducing the number of EV chargers and infrastructure required to support the EV throughput.

Numerous innovations for electric vehicles and devices related thereto have been provided in the prior art, which will be described below in chronological order to show advancement in the art, and which are incorporated herein by reference thereto. Even though these innovations may be suitable for the specific individual purposes to which they address, nevertheless, they differ from the embodiments of the present invention in that they do not teach an overhead mobile charger system for mounting between a pair of adjacent and spaced-apart rows of side-by-side parking spaces and exhibiting full circle traversing so as to reach and charge electric vehicles parked in the pair of adjacent and spaced-apart rows of side-by-side parking spaces.

(1) U.S. Pat. No. 4,158,802 to Rose, II.

U.S. Pat. No. 4,158,802 issued to Rose, II on Jun. 19, 1979 in U.S. class 320 and subclass 2 teaches a rechargeable battery powered electric vehicle including an electric motor powered by a rechargeable storage battery in combination with a recharging station including extendible electrodes for supplying recharging power for the vehicle's storage battery. The vehicle includes a charging circuit connected to the battery, with one lead grounded to the vehicle body and one lead connected to a selected portion of an outer surface of the vehicle. The extendible electrodes are positioned in a charging station to extend toward the vehicle, with one electrode in contact with the grounded portion of the vehicle and another electrode in contact with the insulated surface connected to the vehicle battery, whereby when the vehicle is within reach of the electrodes, they make desired contact between the power station and the battery, and when the vehicle is moved away from the electrodes, the charging connection is broken.

(2) U.S. Pat. No. 4,846,320 to Clarke.

U.S. Pat. No. 4,846,320 issued to Clarke on Jul. 11, 1989 in U.S. class 191 and subclass 12 R teaches a power cable hanger for a mine, which includes a roof mounted rail, a carriage traveling on the rail, a plurality of open-sided hooks to support a cable spaced at intervals along the path of the rail, an arm on the carriage to pick up and place the cable on the hooks and to retrieve the cable from the hooks, and cable apparatus that is independent of the power cable and causes the carriage to travel backwards and forwards on the rail.

(3) U.S. Pat. No. 4,991,802 to Deacon.

U.S. Pat. No. 4,991,802 issued to Deacon on Feb. 12, 1991 in U.S. class 248 and subclass 60 teaches a suspension device for cable or the like, which is formed of nonmetallic flexible material that is woven or braided into elongated, tubular, or sleeve-like form, so that the cable or a like flexible linear body can be passed through the central passageway of the suspension device and out an opening formed in the defining sidewall of the device and be frictionally gripped or held by the device against lengthwise movement relative to the suspension device. The latter can be formed at one end thereof into a self-retaining loop for securing the device and gripped cable or other linear body to an overhead support, thus transmitting any tensile load applied to the cable or other linear body to the support, via the suspension device, and thus preventing any tensile load being transmitted along the cable or other linear body to its connection point, such as, for instance, an electrical junction box.

(4) U.S. Pat. No. 5,323,099 to Bruni et al.

U.S. Pat. No. 5,323,099 issued to Bruni et al. on Jun. 21, 1994 in U.S. class 320 and subclass 2 teaches a weatherized curb-side battery charging system that provides a mechanism for transferring electrical power to an electric vehicle to recharge its battery. The battery charging system includes a housing that is disposed on a wall or is slidably attached to a track mounted to a ceiling, for example. A retractable charging device is coupled to a power supply and mates with a receptacle device disposed in the vehicle. A variety of charging devices may be employed in the battery charging system. Electronic circuitry controls power supplied to the vehicle from the power supply of the charging system. In addition, an interface circuit is provided that allows a user to enter a code to use the system and that provides an identification for billing purposes, or a credit card type key that activates the system and performs the same functions. A fan is provided for cooling purposes that causes an air flow through the system.

(5) U.S. Pat. No. 5,847,537 to Parmley, Sr.

U.S. Pat. No. 5,847,537 issued to Parmley, Sr. on Dec. 8, 1998 in U.S. class 320 and subclass 2 teaches a charging station system of electric vehicles, which has a building that contains the charging equipment and may provide other auxiliary services. The system includes a T-bar that extends from the building to provide charging stalls or locations spaced along the T-bar. The building is modular and incorporates a standard ISO type configuration for ease and convenience of installation and transportation.

It is apparent that numerous innovations for electric vehicles and devices related thereto have been provided in the prior art, which are adapted to be used. Furthermore, even though these innovations may be suitable for the specific individual purposes to which they address, nevertheless, they would not be suitable for the purposes of the embodiments of the present invention as heretofore described, namely, an overhead mobile charger system for mounting between a pair of adjacent and spaced-apart rows of side-by-side parking spaces and exhibiting full circle traversing so as to reach and charge electric vehicles parked in the pair of adjacent and spaced-apart rows of side-by-side parking spaces.

3. SUMMARY OF THE INVENTION

Thus, an object of the embodiments of the present invention is to provide an overhead mobile charger system for mounting between a pair of adjacent and spaced-apart rows of side-by-side parking spaces and exhibiting full circle traversing so as to reach and charge electric vehicles parked in the pair of adjacent and spaced-apart rows of side-by-side parking spaces, which avoids the disadvantages of the prior art.

Briefly stated, another object of the embodiments of the present invention is to provide an overhead mobile charger system for mounting between a pair of adjacent and spaced-apart rows of side-by-side parking spaces and exhibiting full circle traversing so as to reach and charge electric vehicles parked in the pair of adjacent and spaced-apart rows of side-by-side parking spaces. The system includes a single EV battery charger, a boom, and apparatus for rotatably mounting the boom over, and between, the pair of adjacent and spaced-apart rows of side-by-side parking spaces. The single EV battery charger has a power cable terminating in an EV connector. The power cable of the single EV battery charger runs along, and depends from, the boom, and together with the boom being rotatably mounted via the apparatus so as to allow the boom to exhibit full circle traversing, the electric vehicles parked in the pair of adjacent and spaced-apart rows of side-by-side parking spaces are reached and charged by the EV connector of the single EV battery charger.

The novel features considered characteristic of the embodiments of the present invention are set forth in the appended claims. The embodiments of the present invention themselves, however, both as to their construction and to their method of operation together with additional objects and advantages thereof will be best understood from the following description of the embodiments of the present invention when read and understood in connection with the accompanying figures of the drawing.

4. BRIEF DESCRIPTION OF THE FIGURES IN THE DRAWING

Figure 2:
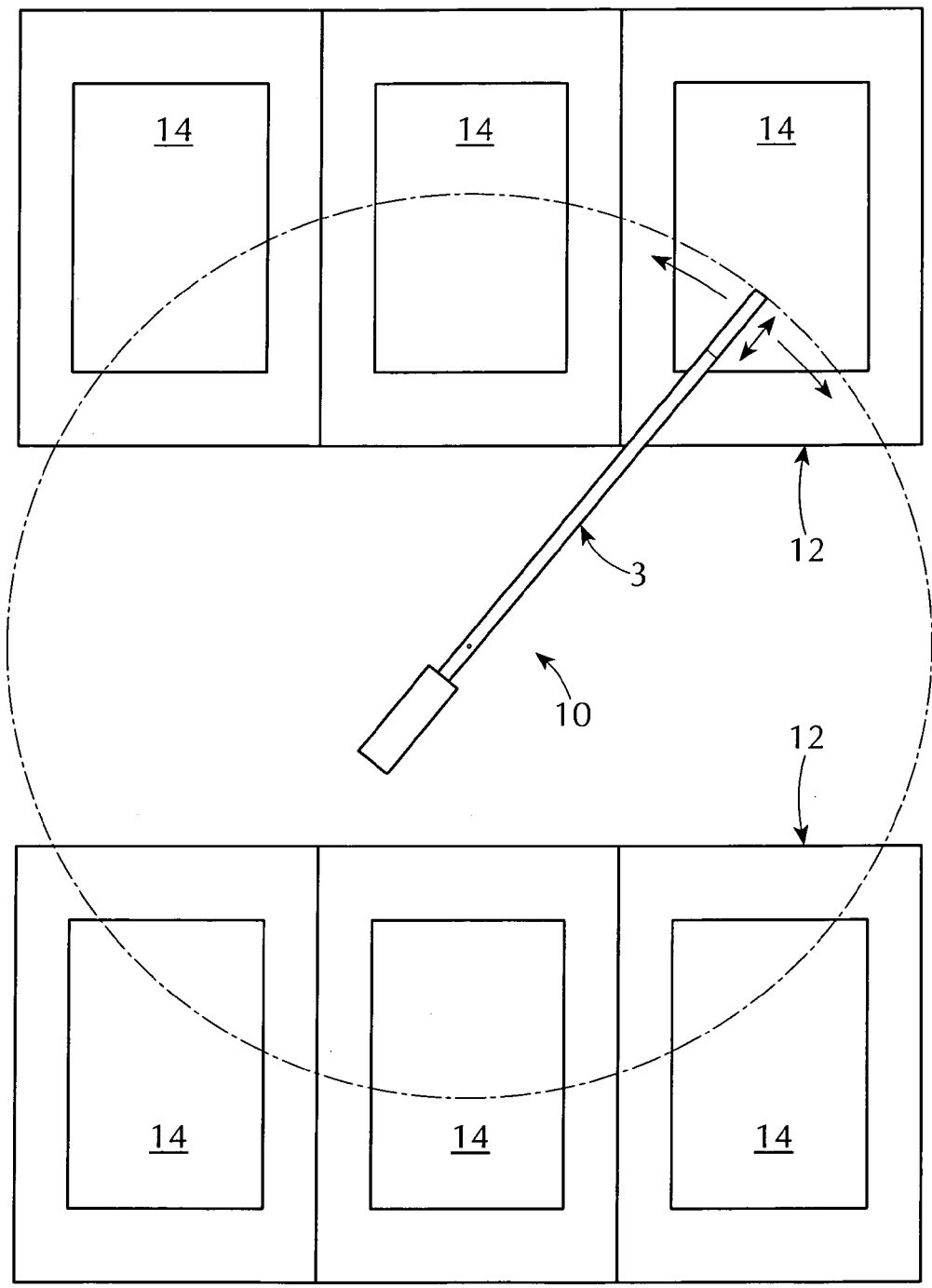
Figure 3:
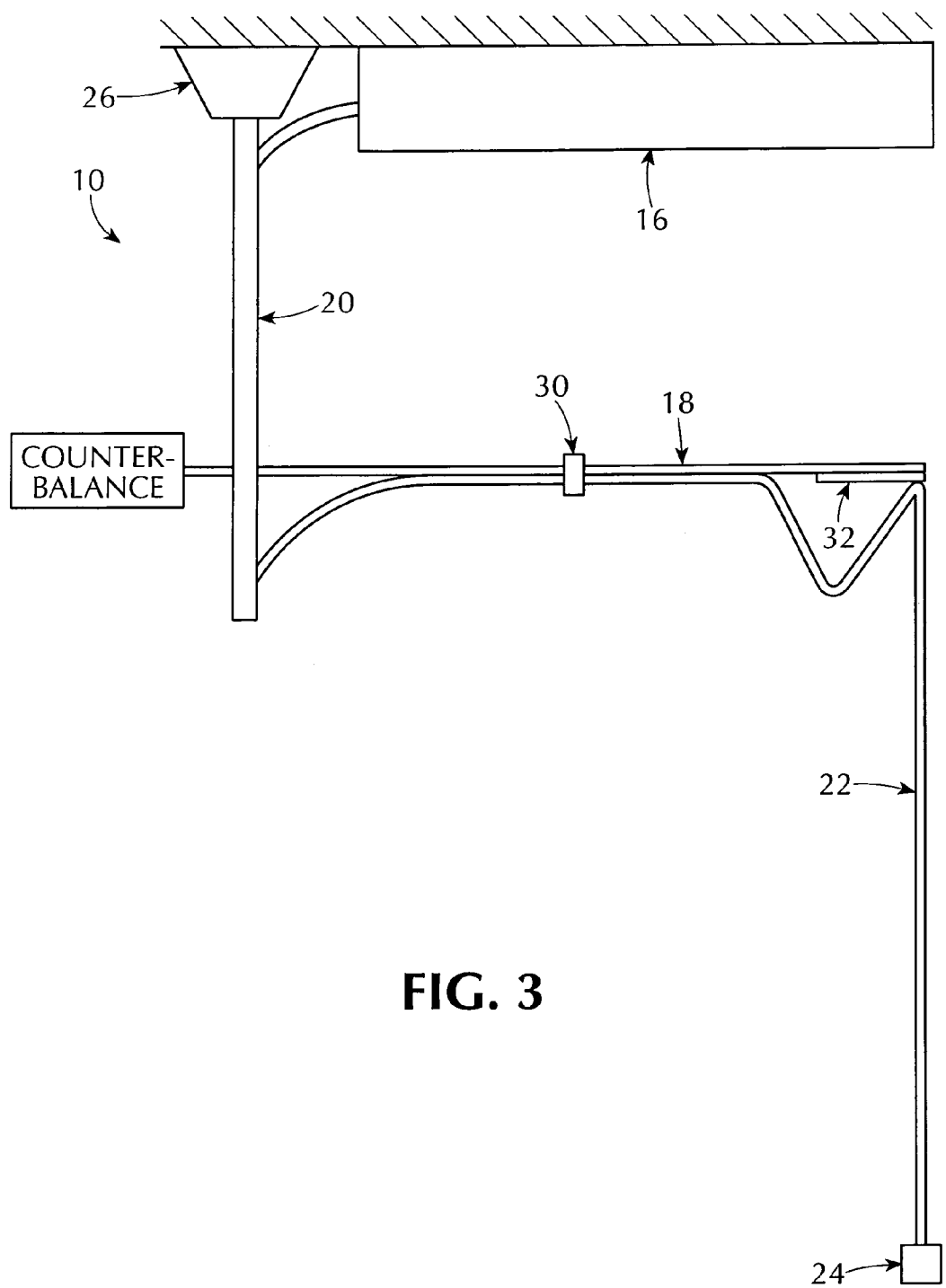

The figures of the drawing are briefly described as follows:

FIG. 1 is a diagrammatic perspective view of a typical prior art EV charging station design;

FIG. 2 is a diagrammatic side elevational view of the overhead mobile charger system of the embodiments of the present invention mounted between a pair of adjacent and spaced-apart rows of side-by-side parking spaces and exhibiting full circle traversing so as to reach and charge electric vehicles parked in the pair of adjacent and spaced-apart rows of side-by-side parking spaces; and FIG. 3 is an enlarged diagrammatic side elevational view of the overhead mobile charger system of the embodiments of the present invention identified by ARROW 3 in FIG. 2.

5. LIST OF REFERENCE NUMERALS UTILIZED IN THE FIGURES OF THE DRAWING

A. Prior Art.
a typical prior art EV charging station design
b overhead charging unit
c ceiling
d retractable cable B. General.
10 overhead mobile charger system of embodiments of present invention for mounting between pair of adjacent and spaced-apart rows of side-by-side parking spaces 12 and exhibiting full circle traversing so as to reach and charge electric vehicles 14 parked in pair of adjacent and spaced-apart rows of side-by-side parking spaces 12
12 pair of adjacent and spaced-apart rows of side-by-side parking spaces
14 electric vehicles parked in pair of adjacent and spaced-apart rows of side-by-side parking spaces 12

C. Configuration of Overhead Mobile Charger System 10.
16 single EV battery charger
18 boom
20 apparatus for rotatably mounting boom over, and between, pair of adjacent and spaced-apart rows of side-by-side parking spaces
22 power cable of single EV battery charger 16
24 EV connector of power cable 22 of single EV battery charger 16
26 ceiling mount
28 floor pole
30 bungi cord
32 trolley

6. DETAILED DESCRIPTION OF THE PREFERRED EMBODIMENTS

A. General.

Referring FIG. 2, which is a diagrammatic side elevational view of the overhead mobile charger system of the embodiments of the present invention mounted between a pair of adjacent and spaced-apart rows of side-by-side parking spaces and exhibiting full circle traversing so as to reach and charge electric vehicles parked in the pair of adjacent and spaced-apart rows of side-by-side parking spaces, the overhead mobile charger system of the embodiments of the present invention is shown generally at 10 for mounting between a pair of adjacent and spaced-apart rows of side-by-side parking spaces 12 and exhibiting full circle traversing so as to reach and charge electric vehicles 14 parked in the pair of adjacent and spaced-apart rows of side-by-side parking spaces 12.

B. Configuration of the Overhead Mobile Charger System 10.

The configuration of the overhead charger system 10 can best be seen in FIG. . 3, which is an enlarged diagrammatic side elevational view of the overhead mobile charger system of the embodiments of the present invention identified by ARROW 3 in FIG. 2, and as such, will be discussed with reference thereto.

The overhead charger system 10 comprises a single EV battery charger 16, a boom 18, and apparatus 20 for rotatably mounting the boom 18 over, and between, the pair of adjacent and spaced-apart rows of side-by-side parking spaces 12. The single EV battery charger 16 has a power cable 22 terminating in an EV connector 24. The power cable 22 of the single EV battery charger 16 runs along, and depends from, the boom 20, and together with the boom 20 being rotatably mounted via the apparatus 18 so as to allow the boom 20 to exhibit full circle traversing, the electric vehicles 14 parked in the pair of adjacent and spaced-apart rows of side-by-side parking spaces 12 are reached and charged by the EV connector 24 of the single EV battery charger 16.

In one embodiment, the apparatus 18 includes a ceiling mount 26, and in another embodiment, the apparatus 18 includes a floor pole 28.

The boom 20 is counterbalanced, cantilevered, and for providing an attendant with an ability to quickly move the power cable 22 and the EV connector 24 from one electric vehicle 14 location to another.

The overhead charger system 10 further comprises a bungi cord 30. The bungi cord 30 keeps the power cable 22 of the single EV battery charger 16 up and out of the way during rotation of the boom 20.

The overhead charger system 10 further comprises a trolley 32. The trolley 32 runs up and down the boom 20 carrying the power cable 22 of the single EV battery charger 16 therewith, so together with the full circle traversing of the boom 20, allows the electric vehicles 14 parked in the pair of adjacent and spaced-apart rows of side-by-side parking spaces 12 to be reached and charged by the EV connector 24 of the single EV battery charger 16.

C. Impressions.

It will be understood that each of the elements described above or two or more together may also find a useful application in other types of constructions differing from the types described above.

While the embodiments of the present invention have been illustrated and described as embodied in an overhead mobile charger system for mounting between a pair of adjacent and spaced-apart rows of side-by-side parking spaces and exhibiting full circle traversing so as to reach and charge electric vehicles parked in the pair of adjacent and spaced-apart rows of side-by-side parking spaces, nevertheless, they are not limited to the details shown, since it will be understood that various omissions, modifications, substitutions, and changes in the forms and details of the embodiments of the present invention illustrated and their operation can be made by those skilled in the art without departing in any way from the spirit of the embodiments of the present invention.

Without further analysis, the foregoing will so fully reveal the gist of the embodiments of the present invention that others can by applying current knowledge readily adapt them for various applications without omitting features that from the standpoint of prior art fairly constitute characteristics of the generic or specific aspects of the embodiments of the present invention.

The invention claimed is:

1. An overhead mobile charger system for mounting between a pair of adjacent and spaced-apart rows of side-by-side parking spaces and exhibiting full circle traversing so as to reach and charge electric vehicles parked in the pair of adjacent and spaced-apart rows of side-by-side parking spaces, comprising:
   a) a single EV battery charger;
   b) a boom; and
   c) means for rotatably mounting said boom over, and between, the pair of adjacent and spaced-apart rows of side-by-side parking spaces;
   wherein said single EV battery charger has a power cable terminating in an EV connector; and
   wherein said power cable of said single EV battery charger runs along, and depends from, said boom, and together with said boom being rotatably mounted via said means so as to allow said boom to exhibit full circle traversing, the electric vehicles parked in the pair of adjacent and spaced-apart rows of side-by-side parking spaces are reached and charged by said EV connector of said single EV battery charger.

2. The system of claim 1, wherein said means includes a ceiling mount.

3. The system of claim 1, wherein said means includes a floor pole.

4. The system of claim 1, wherein said boom is counterbalanced.

5. The system of claim 1, wherein said boom is cantilevered.

6. The system of claim 1, further comprising a bungi cord.

7. The system of claim 6, wherein said bungi cord keeps said power cable of said single EV battery charger up and out of the way during rotation of said boom.

8. The system of claim 1, further comprising a trolley.

9. The system of claim 8, wherein said trolley runs up and down said boom carrying said power cable of said single EV battery charger therewith, so together with said full circle traversing of said boom, allows the electric vehicles parked in the pair of adjacent and spaced-apart rows of side-by-side parking spaces to be reached and charged by said EV connector of said single EV battery charger.

* * * * *